US007176808B1

(12) United States Patent
Broad et al.

(10) Patent No.: US 7,176,808 B1
(45) Date of Patent: Feb. 13, 2007

(54) SYSTEM AND METHOD FOR UPDATING A NETWORK OF REMOTE SENSORS

(75) Inventors: Alan S. Broad, Palo Alto, CA (US); Matt Miller, Grass Valley, CA (US); Michael A. Horton, Los Gatos, CA (US)

(73) Assignee: Crossbow Technology, Inc., San Jose, CA (US)

( * ) Notice: Subject to any disclaimer, the term of this patent is extended or adjusted under 35 U.S.C. 154(b) by 597 days.

(21) Appl. No.: 10/706,225

(22) Filed: Nov. 11, 2003

Related U.S. Application Data

(63) Continuation-in-part of application No. 09/676,056, filed on Sep. 29, 2000, now abandoned.

(51) Int. Cl.
*G08B 23/00* (2006.01)
(52) U.S. Cl. .................. 340/870.07; 707/100; 370/331
(58) Field of Classification Search ........... 340/870.07; 707/100; 702/138; 370/331
See application file for complete search history.

(56) References Cited

U.S. PATENT DOCUMENTS

| 6,032,109 | A | 2/2000 | Ritmiller, III |
| 6,243,654 | B1 | 6/2001 | Johnson et al. |
| 6,392,562 | B1 | 5/2002 | Boston et al. |
| 7,035,240 | B1* | 4/2006 | Balakrishnan et al. ...... 370/338 |
| 2003/0063585 | A1* | 4/2003 | Younis et al. ............... 370/331 |
| 2004/0010492 | A1* | 1/2004 | Zhao et al. .................... 707/3 |
| 2004/0098218 | A1* | 5/2004 | Ito et al. ..................... 702/138 |
| 2004/0122833 | A1* | 6/2004 | Forth et al. ................. 707/100 |
| 2006/0130142 | A1* | 6/2006 | Mester et al. ................. 726/23 |

OTHER PUBLICATIONS

IEEE Instrumentation and Measurement Society, "IEEE Standard for a Smart Transducer Interface for Sensors and Actuators—Transducers to Microprocessor Communication Protocols and Transducers Electronic Data Sheet (TEDS) Formats", IEEE Std. 1451.2-1997.

* cited by examiner

*Primary Examiner*—Timothy Edwards, Jr.
(74) *Attorney, Agent, or Firm*—Fenwick & West LLP

(57) ABSTRACT

A method and system updates a network of sensors remotely through the use of a communication link. The sensors to be updated as well as data files to perform the updating are selected at a base station. The selected sensors are notified of the upcoming update by the base station and may accept or reject the update. The sensors that approve the update then receive data files through the communication link. The sensors notify the base station of any missing data files, which are then retransmitted to all sensors that may be missing data files from the first transmission. After the sensors receive all data files, the update is initiated.

8 Claims, 4 Drawing Sheets

| Dest 50 | AMID 52 | GID 54 | Len 56 | CMD 58 | SUBCMD 60 | PID 62 | CID 64 | Data 66 |

SYSTEM AND METHOD FOR UPDATING A NETWORK OF REMOTE SENSORS

RELATED APPLICATION

This application is a continuation-in-part of application Ser. No. 09/676,056, entitled "Intelligent Smart Cable for Integrating Sensors to Measurement System" filed on Sep. 29, 2000 now abandoned by A. Broad, which is incorporated herein in its entirety by this reference to form a part hereof.

FIELD OF THE INVENTION

This invention relates generally to a network of sensors and more particularly to remotely recalibrating and reprogramming a network of sensors through a base station.

BACKGROUND OF THE INVENTION

Sensors are commonly used in a variety of different environments for monitoring diverse parameters such as, for example, temperature, pressure, and humidity. Because the sensors are constantly monitoring, they need to be periodically recalibrated and reprogrammed. In a large network of sensors containing hundreds of individual sensors that may be located in harsh and noisy environments and spread throughout a vast geography, it becomes impractical to manually recalibrate and reprogram each individual sensor. Additionally, because the sensors may be located in harsh and noisy environments and may be connected through a wireless radio communications link, the communication method must be robust in order to avoid loss or corruption of the sensor data.

Further, each sensor is typically powered by a battery and therefore has limited energy supply and operational capabilities. Therefore, the method of recalibrating or reprogramming used must be energy efficient and use as few cycles of data transmissions as possible.

SUMMARY OF THE INVENTION

In accordance with an operational embodiment of the present invention, a user at a base station selects the sensors to be updated as well as the update programs to be used. The base station, in turn, sends broadcast messages through a communication link to the selected sensors notifying them of the upcoming update. The sensors may accept or reject this update. If the sensor rejects the update, the user is notified and the update is rescheduled for a later time. If the sensor accepts, the base station sends the selected data or recalibration program or updating messages through the communication link to the selected sensors. Once all the sensors receive a complete data code set from the base station, the user at the base station initiates the update of the selected sensors and the selected sensors are updated.

DETAILED DESCRIPTION OF THE INVENTION

Figures 1, 2:
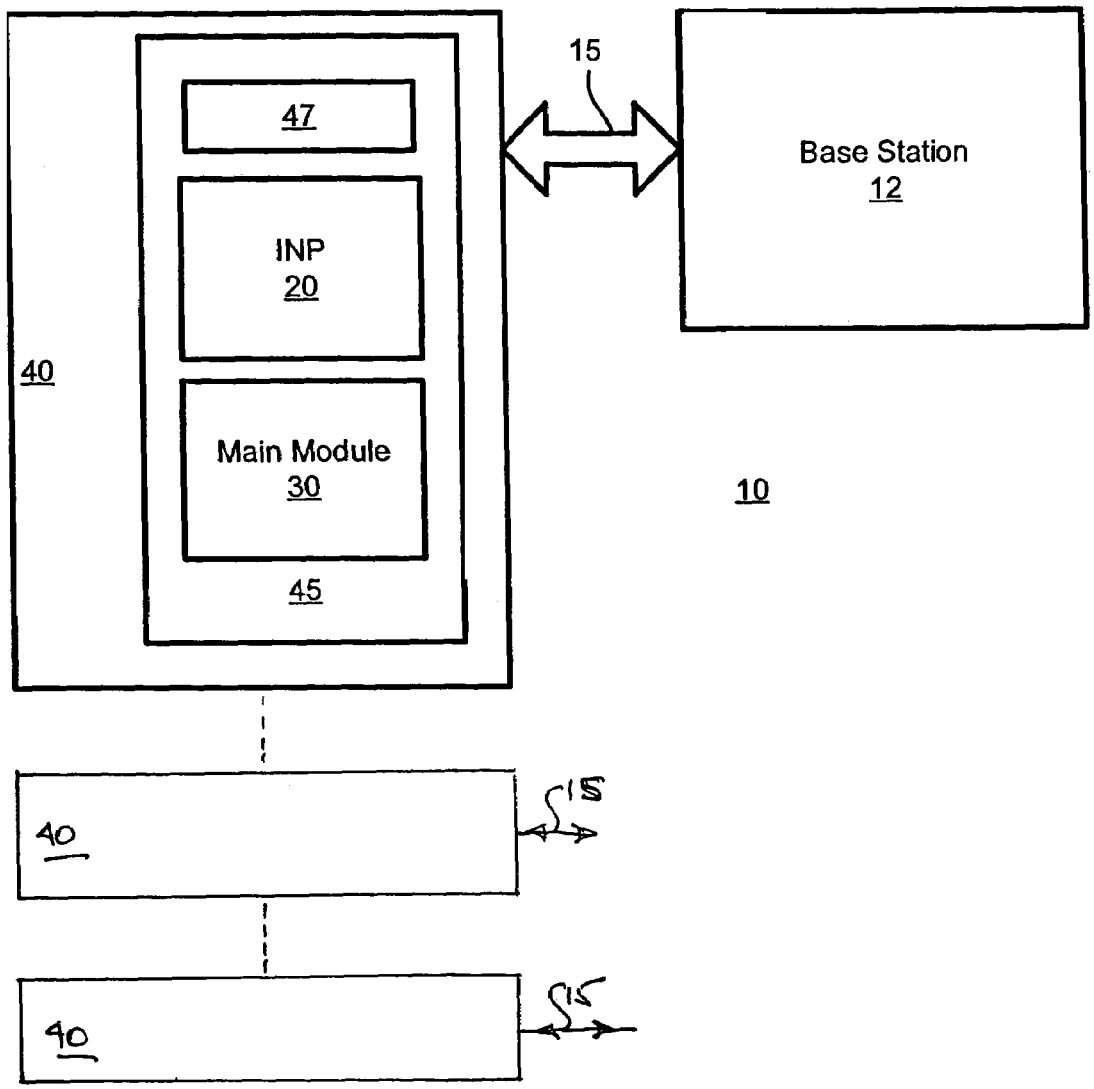
FIG. 1 is a block diagram illustrating the components used in remotely updating a network of sensor according to an embodiment of the present invention.
FIG. 2 illustrates an in-network-processing (INP) message packet according to an embodiment of the present invention.

FIG. 1 is a block diagram illustrating the components used in updating a network of sensors according to an embodiment of the present invention. The system 10 includes one or more sensors 40 that passively measure the conditions of its surroundings such as, for example, light, temperature, humidity, pressure, magnetic fields, or the like. The number of sensors 40 in the system 10 may vary and typically a network of sensors 40 uses unique address for each sensor 40. In one embodiment, the sensor 40 includes a microcontroller 45 with firmware of the microcontroller 45 that contains an in-network processing (INP) module 20, a main module 30 and a memory 47. In one embodiment, the memory 47 is an EEPROM but other types of memory may also be used. The main module 30 stores various information pertinent to the sensor 40 such as the calibration parameters and associated signal processing requirements. For example, see the U.S. patent application Ser. No. 09/676,056. The INP module 20 recalibrates, reprograms, or updates some or all of the microcontroller main modules 30 of the distributed network sensors 40 without disruption to the network.

A base station 12 is communicatively connected to the sensor 40 through a common shared bus or communication link 15. The base station 12 includes a graphic user interface (GUI), which can be, for example, a desktop computer, laptop computer, a PDA, or any device capable of receiving input from the user. The GUI allows the user to control the INP process remotely. The base station 12 is also capable of receiving and transmitting communication. Preferably, the bus is a wireless communication link 15 such as, for example, a radio link. However, the bus also can be a wired link such as, for example, an Ethernet connection. The communication link 15 allows the base station 12 to broadcast messages to all the sensors 40 in a network, to a subset of sensors 40 in the network, or to the individual sensors 40 on a one-to-one basis as determined by the transmitted sensor addresses. The microcontroller 45 enables communication between the base station 12 and the sensor 40.

Before deploying the sensor 40 to its monitoring location, its INP module 20 is pre-programmed with an unique address to recognize and accept messages from the base station 12. The INP module 20 intercepts the messages sent by the base station 12 over the communication link 15. Specifically, the INP module 20 identifies the messages sent by the base station 12 to the INP by parsing the message packet and sensing the AMID data field of the message, as described herein with reference to FIG. 2.

FIG. 2 illustrates an in-network processing (INP) message packet according to an embodiment of the present invention. The message packets contain the address information necessary to locate the sensor needing updating as well as the data required to do the updating. In one embodiment, the individual fields are as follows. The Dest field 50 identifies the sensor 40 destination of the INP message packet. A broadcast ID can be used to program all sensors with the same GID simultaneously. The AMID field 52 identifies the type of message. The AMID field 52 is the field that the INP module 20 recognizes, and identifies the message packet as containing an INP message. The GID field 54 identifies the group ID and associates the selected sensor 40 with the other sensors 40 in the sensor network. A broadcast message can be used to program all sensors with the same GID simultaneously. The Len field 56 indicates the length of the message packet. The CMD field 58 contains the command field which indicates the type of command to be performed by the message packet, for example, download, query, retransmit, or the like. The SUBCMD field 60 contains the subcommand to be applied to the data contained in the message packet. The PID field 62 is used for validation and contains the checksum for the program code. The CID field 64 contains the sequence number for each program code capsule. Finally, the Data field 66 contains the program data capsule.

Figure 3:
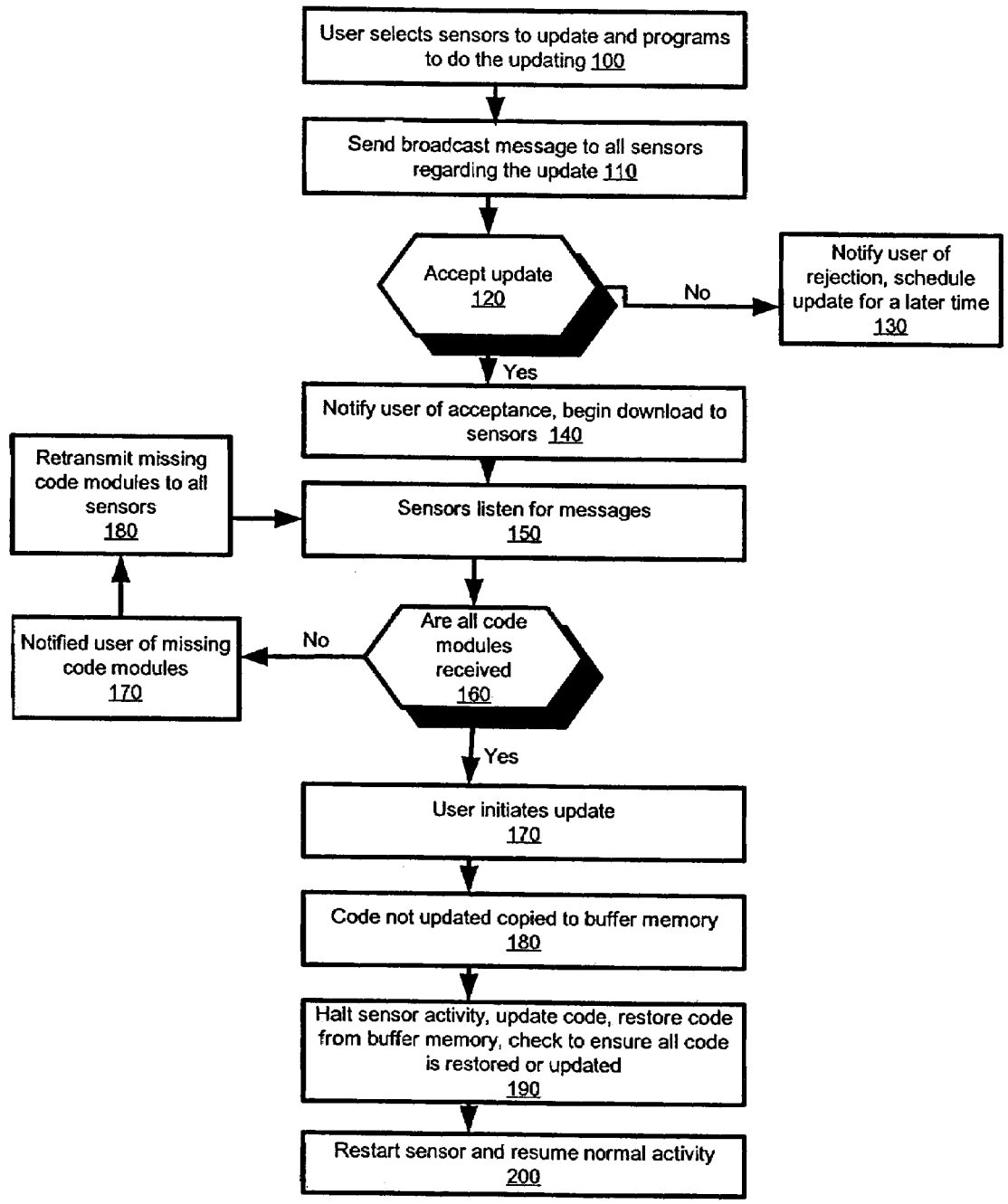
FIG. 3 is a flow chart illustrating the procedure for updating a remote sensor in accordance with one embodiment of the present invention.

FIG. 3 is a flow chart illustrating the procedure for updating a remote sensor in accordance with one embodiment of the present invention. From the GUI of the base station 12, the user is able to select the sensors 40 on the network that need to be updated 100. The user can select one sensor 40, a group or subset of sensors 40, or the entire network of sensors 40. The sensors 40 can be identified by location using the Dest field 50, or by group using the GID field 54. Additionally, from the GUI of the base station 12, the user selects an updating program to be downloaded to the sensors 40. For example, the user may want to recalibrate a selected sensor 40 or update the sensor programming.

Figure 4:
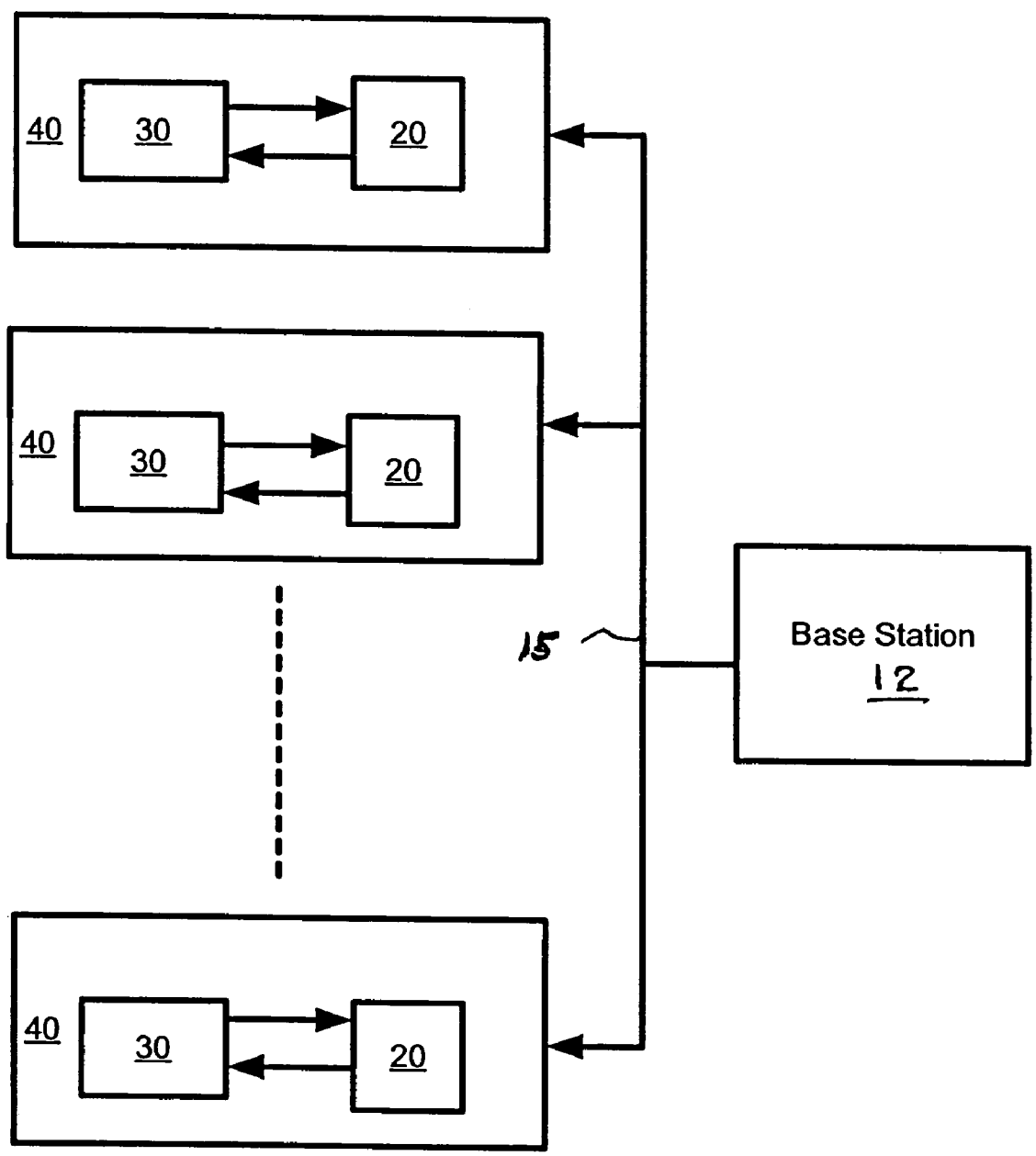
FIG. 4 is a system diagram illustrating the broadcast procedure according to an embodiment of the present invention.

The base station 12 then broadcasts a message 110 to the selected sensors 40. FIG. 4 is a system diagram illustrating the broadcast procedure according to an embodiment of the present invention. The broadcast message will be similar to the one describe above in FIG. 2. The message packet contains an AMID field 52 to indicate that it is an INP message for triggering the INP module 20 to poll the main module 30 regarding whether to accept or decline the update 120. The main module 30 can decline the update, for example, if the update would interfere with a time-sensitive operation being performed by the main module 30. If the main module 30 declines the update 130, the user at the base station 12 is notified and the update can be rescheduled at later time for that particular sensor 40.

If the main module 30 accepts the update 140, the user at the base station 12 is again notified and the INP module 20 switches into active state and begins listening for updating programming messages 150 to be broadcasted from the base station 12 over the communications link 15. The base station 12 begins broadcasting the updating programming messages with the relevant program data capsules contained in the Data field 66 of the message packet to the sensors 40 identified by the Dest field 50 and the GID field 54 of the message packet. The AMID 52 field identifies the message packet to the INP module 20 as being INP messages. The INP module 20 then stores the program data capsules from the Data field 66 of the updating programming message in the memory 47 of the sensor 40.

Figure 5:
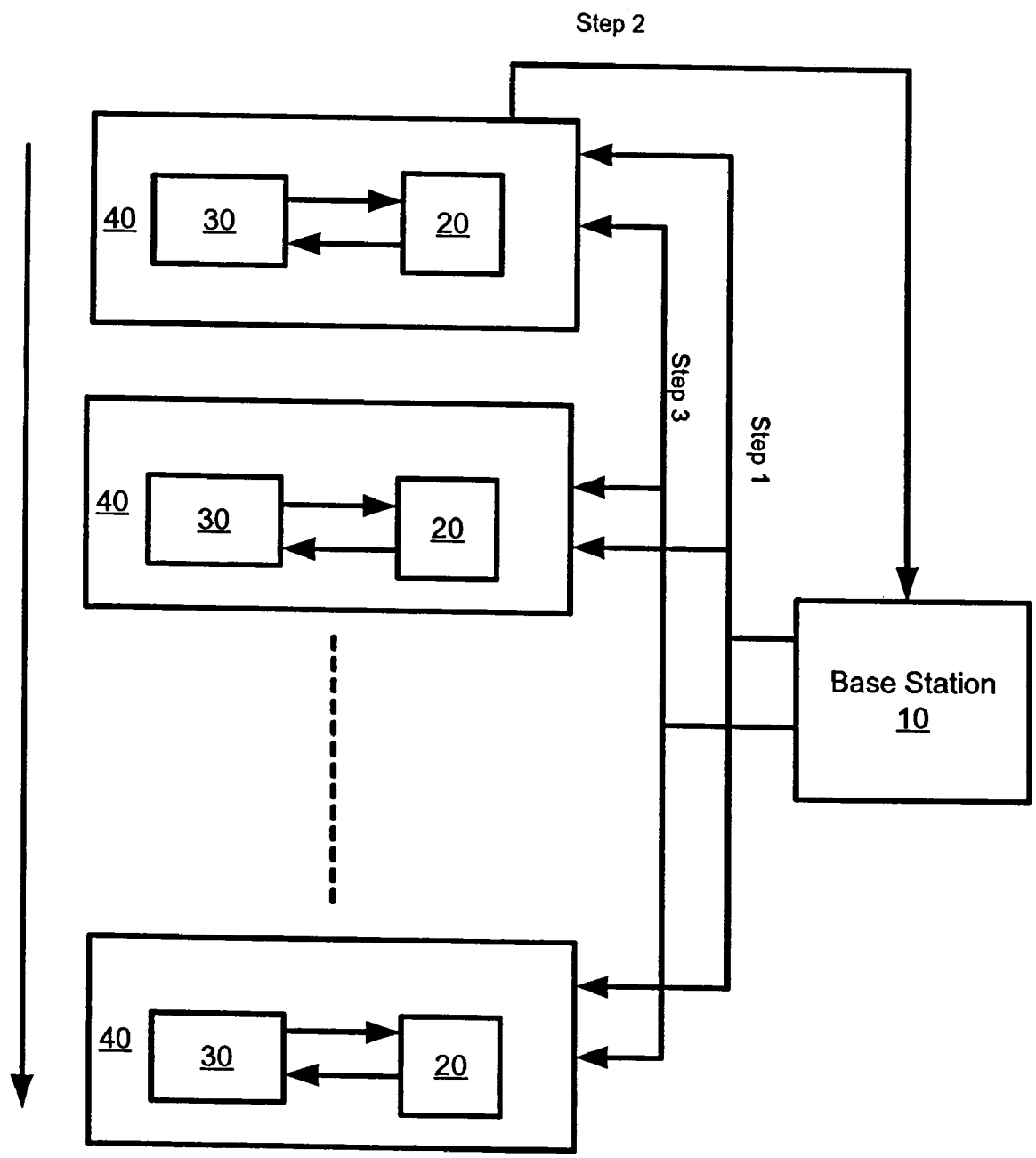
FIG. 5 is a pictorial illustration of the query procedure according to an embodiment of the present invention.

Once the base station 12 has transmitted all the program data capsules, the query phase begins. FIG. 5 is a pictorial illustration of the query procedure according to an embodiment of the present invention. Step 1 involves downloading the program data capsules to the sensors 40 as described above. The INP module 20 reviews PID field 62 and the CID field 64 of the messages for completeness as the messages are received. The INP module 20 discovers missing program data capsules by reviewing the program data capsule sequence numbers. In addition, the INP module 20 determines whether there is a complete set of sequence numbers 160. Once the INP module 20 notices that a program data capsule is missing 170, the INP module 20 requests the base station 12 to retransmit the updating programming message containing that missing program data capsule in Step 2, 180.

During operation of the communication link 15 in a noisy and harsh environment, if one sensor 40 is missing a particular program data capsule it is highly likely that another sensor 40 is also missing the same program data capsule. Therefore, in Step 3, the base station 12 will retransmit the missing program data capsule to all the selected sensors 40 that accepted the update. Retransmitting to all the sensors 40 that accepted the update after receiving a retransmission request saves energy because only one sensor 40 makes the request instead of all the sensors 40 that are missing a particular program data capsule making the request to retransmit. The sensors 40 will continue to request missing program data capsules until all the sensors 40 that accepted the update have a complete series of sequence numbers 170.

Once all the sensors 40 that accepted the update receive a complete set of program data capsules, the user can then initiate the update, but can schedule the update for a time of low sensor 40 activity such as, for example, at night. The user may want to wait to initiate the update because all activity of the sensor 40 is interrupted during the update.

The first step of the update involves copying all the program data not to be updated 180 currently in the main module 30 into the memory 47. The memory 47 will then contain a complete memory image including the new download program data capsules and the current program data that is not to be replaced by the updating program. Next, all sensor 40 operations are halted. The new program data and the non-updated program data are then copied over into the main module 30 and content is checked for completeness 190. The sensor 40 is then restarted and the sensor 40 returns to normal activity with updated memory contents 200.

Therefore, the network of sensors operated in accordance with present invention provides for a robust method and system of updating a network of sensors by exchanging data through a communication link to a remote base station. The updating communications provides an efficient use of power with the least amount of energy drain.

What is claimed is:

1. A method of updating a network of a plurality of sensors from a remote base station, comprising:
    selecting sensors to be updated along with data files;
    alerting selected sensors of the upcoming update;
    receiving at the remote base station the acceptance or rejection of the update from selected ones of the plurality of sensors;
    transmitting the selected data files to the sensors that accept the updating data files; and
    initiating update after all the selected data files are downloaded to each of the selected sensors.

2. The method of claim 1 further comprising:
    receiving at the base station notification from a sensor that data files are missing; and
    retransmitting the data files to all sensors that are missing data files from the first transmission.

3. The method of claim 1 wherein initiating further comprises:
    storing files in the sensors that are not being updated;
    stopping sensor activity during updating;
    restoring all files;
    comparing files for completeness; and
    resuming sensor activity after updating is complete.

4. The method of claim 1 wherein initiating further comprises:
    scheduling a time for the update.

5. A method of receiving and updating data files in a sensor remotely, comprising:
- receiving a broadcast notification of an update of data files;
- accepting or declining the data file update;
- switching to active state if the data file update is accepted;
- receiving data file;
- inspecting data files for completeness;
- requesting any missing data files;
- listening for broadcasts of missing files;
- storing data files not being updated once all data files are received;
- stopping all sensor activity and initiating update; and
- resuming all sensor activity after updating is complete.

6. A processor readable storage medium containing processor readable code for programming a processor of a sensor from a remote base station to perform a method comprising the steps of:
- receiving a broadcast notification from the base station of an update of data files;
- accepting or declining the data file update;
- switching to active state if the data file update is accepted;
- receiving data file;
- inspecting data files for completion;
- requesting any missing data files;
- listening for broadcasts of missing files;
- storing data files not being updated until all data files are received;
- stopping all sensor activity and initiating update; and
- resuming all sensor activity after updating is complete.

7. A processor readable storage medium containing processor readable code for programming a processor in a base station to update a network of a plurality of remote sensors to perform a method comprising the steps of:
- selecting sensors to be updated with data files to perform the updating;
- alerting selected sensors of the upcoming update;
- receiving at the base station acceptance or rejection of the update from selected ones of the plurality of sensors;
- transmitting from the base station the selected data files to the sensors to accept the updating data files; and
- initiating update after all the selected data files are downloaded to each of the selected sensors.

8. The processor readable storage medium method of claim 7 further comprising the steps of:
- receiving notification from a sensor that data files are missing; and
- retransmitting the data files to all sensors that are missing data files from the first transmission.

* * * * *